(12) United States Patent
Korf et al.

(10) Patent No.: US 10,591,001 B2
(45) Date of Patent: Mar. 17, 2020

(54) FAULT TOLERANT ACTUATOR

(71) Applicant: HONEYWELL INTERNATIONAL INC., Morris Plains, NJ (US)

(72) Inventors: Jaroslav Korf, Bilina (CZ); Antonin Skarolek, Brno (CZ)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 178 days.

(21) Appl. No.: 15/824,027

(22) Filed: Nov. 28, 2017

(65) Prior Publication Data

US 2018/0149214 A1 May 31, 2018

Related U.S. Application Data

(60) Provisional application No. 62/427,586, filed on Nov. 29, 2016.

(51) Int. Cl.
*F16D 48/10* (2006.01)
*F16D 48/06* (2006.01)
*F16D 11/06* (2006.01)

(52) U.S. Cl.
CPC .............. *F16D 48/10* (2013.01); *F16D 11/06* (2013.01); *F16D 48/064* (2013.01); *F16D 2300/12* (2013.01); *F16D 2300/26* (2013.01); *F16D 2500/104* (2013.01); *F16D 2500/1023* (2013.01)

(58) Field of Classification Search
CPC ........ F16D 48/10; F16D 48/064; F16D 11/06; F16D 2300/26; F16D 2500/1023; F16D 2300/12; F16D 2500/104
See application file for complete search history.

(56) References Cited

U.S. PATENT DOCUMENTS

| | | | | |
|---|---|---|---|---|
| 4,417,650 | A * | 11/1983 | Geisthoff | F16D 43/2028 192/56.1 |
| 4,566,570 | A * | 1/1986 | Geisthoff | F16D 7/048 192/56.1 |
| 6,666,283 | B2 * | 12/2003 | Frauhammer | B25B 23/141 173/93 |
| 8,672,110 | B2 * | 3/2014 | Jaeger | F16D 7/048 192/56.1 |
| 9,115,768 | B2 * | 8/2015 | Sturgin | F16D 13/14 |
| 9,746,039 | B2 * | 8/2017 | He | F16D 41/063 |
| 10,138,947 | B2 * | 11/2018 | Littlefield | F16D 11/16 |
| 10,190,643 | B2 * | 1/2019 | Littlefield | F16D 11/16 |
| 10,247,252 | B2 * | 4/2019 | Littlefield | F16D 11/16 |
| 2013/0248317 | A1 * | 9/2013 | Lee | F16D 13/40 192/70.11 |

\* cited by examiner

*Primary Examiner* — David J Hlavka
(74) *Attorney, Agent, or Firm* — Lorenz & Kopf, LLP (57) ABSTRACT

An actuator assembly having an outer section and an inner section that are moveable relative to each other has a clutch assembly mounted on the outer section. The clutch includes a clutch housing, a clutch motor, and a plurality of pins. The clutch housing is rotatable between an engaged position and a disengaged position. The clutch motor is coupled to the clutch housing and is configured to rotate the clutch housing between the engaged position and the disengaged position. The pins are disposed within, and extend radially inwardly from, the clutch housing, and each pin is movable between an extended position and a retracted position. When the clutch housing is rotated into the engaged position, the pins are moved to, and retained in, the extended position, and when the clutch housing is rotated into the disengaged position, the pins are movable to the retracted position.

20 Claims, 7 Drawing Sheets

FAULT TOLERANT ACTUATOR

CROSS-REFERENCE TO RELATED APPLICATION

This application claims priority to U.S. Provisional Patent Application No. 62/427,586, filed on Nov. 29, 2016, the entirety of which is hereby incorporated by reference.

TECHNICAL FIELD

The present invention relates to actuators and, more particularly, to a flight control surface actuator that includes a mechanism that enables portions of the actuator to be decoupled in the unlikely event of a jam or other postulated fault.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications, such as, for example, aircraft flight surface control systems and thrust reverser actuation control systems, the actuators that are used may be subject to relatively severe environmental conditions, as well as relatively high magnitude shock and vibration.

As a result of, for example, the environmental conditions, and relatively high magnitude shock and vibration an actuator may experience, the actuator could become jammed or otherwise inoperable, and thereby prevent movement of the actuated component, such as a flight control surface. For example, the actuator gear train could potentially jam or, if the actuator is a ballscrew-type actuator, the ball returns could become jammed. Under such conditions the actuator may "lock up" or otherwise become inoperable, thus obstructing the controlled surface. Though such situations are unlikely, analysis has shown that secondary damage to other portions of the actuator, or to various portions of the system in which the actuator is installed, may result under certain postulated circumstances. For example, if an actuator becomes jammed, it is postulated that all of the drive force supplied from the drive force source could be concentrated on the jammed actuator. This postulated condition may result in damage to the actuator or the system in which it is installed. Repairing such damage can be costly and result in system down time. This postulated condition can also lead to the inability to operate the controlled component, such as a flight control surface. One solution is to use stronger components, but this increases the cost and/or weight of the system. Another solution is to include numerous, independently operated torque limiters or decoupler assemblies. However, this solution may also increase system cost and/or weight.

Accordingly, there is a need for an actuator that improves upon one or more of the drawbacks identified above. Namely, an actuator that reduces the likelihood of component damage if the actuator becomes inoperable by, for example, becoming jammed, without significantly increasing the cost and/or the weight of system components and/or that does not prevent movement of the actuated component by other actuators to which the jammed actuator is connected, thereby reducing the likelihood of, for example, a flight control surface jam event. The present invention addresses one or more of these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a fault tolerant actuator assembly includes an actuator housing outer section, an actuator housing inner section, a plurality of first openings, a plurality of second openings, and a clutch. The actuator housing outer section has an inner surface and an outer surface. The inner surface defines an outer section cavity. The actuator housing inner section is disposed at least partially within the outer section cavity, and has an inner surface and an outer surface. The first openings are formed in the actuator housing outer section and extend between the inner surface and the outer surface of the actuator housing outer section. The second openings are formed in the actuator housing inner section and extend between the inner surface and the outer surface of the actuator housing inner section, and each second opening is aligned with a different one of the first openings. The clutch is mounted on the actuator housing outer section and includes a clutch housing, a clutch motor, and a plurality of pins. The clutch housing surrounds a portion of the actuator housing outer section, and is rotatable, relative to the actuator housing outer section, between an engaged position and a disengaged position. The clutch motor is coupled to the clutch housing and is configured, upon being energized, to rotate the clutch housing between the engaged position and the disengaged position. The pins are disposed within, and extend radially inwardly from, the clutch housing. Each pin extends at least partially into a different one of the first openings and is movable between an extended position, in which each pin is disposed within a different one of the second openings, and a retracted position, in which each pin is not disposed within a different one of the second openings. When the clutch housing is rotated into the engaged position, the pins are moved to, and retained in, the extended position, to thereby prevent relative movement between the actuator housing outer and inner sections, and when the clutch housing is rotated into the disengaged position, the pins are movable to the retracted position, to thereby allow relative movement between the actuator housing outer and inner sections.

In another embodiment, a clutch assembly that is adapted to be mounted on an actuator assembly having an outer section and an inner section that are moveable relative to each other includes a clutch housing, a clutch motor, and a plurality of pins. The clutch housing is configured to surround a portion of the actuator housing outer section, and is rotatable between an engaged position and a disengaged position. The clutch motor is coupled to the clutch housing and is configured, upon being energized, to rotate the clutch housing between the engaged position and the disengaged position. The pins are disposed within, and extend radially inwardly from, the clutch housing, and each pin is movable between an extended position and a retracted position. When the clutch housing is rotated into the engaged position, the pins are moved to, and retained in, the extended position, and when the clutch housing is rotated into the disengaged position, the pins are movable to the retracted position.

In yet another embodiment, a fault tolerant actuator assembly includes an actuator housing outer section, an actuator housing inner section, a plurality of first openings, a plurality of second openings, and a clutch. The actuator housing outer section has an inner surface and an outer surface, and the inner surface of the actuator housing outer section defines an outer section cavity. The actuator housing inner section is disposed at least partially within the outer section cavity. The actuator housing inner section has an inner surface and an outer surface, and the inner surface of the actuator housing inner section defines an inner section cavity. The first openings are formed in the actuator housing outer section and extend between the inner surface and the outer surface of the actuator housing outer section. The second openings are formed in the actuator housing inner section and extend between the inner surface and the outer surface of the actuator housing inner section. Each second opening is aligned with a different one of the first openings. The clutch is disposed within the inner section cavity and includes a clutch housing, a clutch motor, and a plurality of pins. The clutch housing is rotatable, relative to the actuator housing inner section, between an engaged position and a disengaged position. The clutch motor is coupled to the clutch housing and is configured, upon being energized, to rotate the clutch housing between the engaged position and the disengaged position. The pins are disposed within, and extend radially outwardly from, the clutch housing. Each pin extends at least partially into a different one of the second openings and is movable between an extended position, in which each pin is disposed within a different one of the first openings, and a retracted position, in which each pin is not disposed within a different one of the first openings. When the clutch housing is rotated into the engaged position, the pins are moved to, and retained in, the extended position, to thereby prevent relative movement between the actuator housing outer and inner sections. When the clutch housing is rotated into the disengaged position, the pins are movable to the retracted position, to thereby allow relative movement between the actuator housing outer and inner sections.

Furthermore, other desirable features and characteristics of the fault tolerant actuator assembly and the clutch assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Thus, although embodiments of the actuator are herein described as being implemented in an aircraft flight control system, this is done merely to describe one example of an end-use environment in which the actuator may be implemented. It will be appreciated that the actuator herein described may be implemented in numerous other aircraft systems, and in numerous other systems that are not installed on an aircraft or any other type of vehicle.

Figure 1:
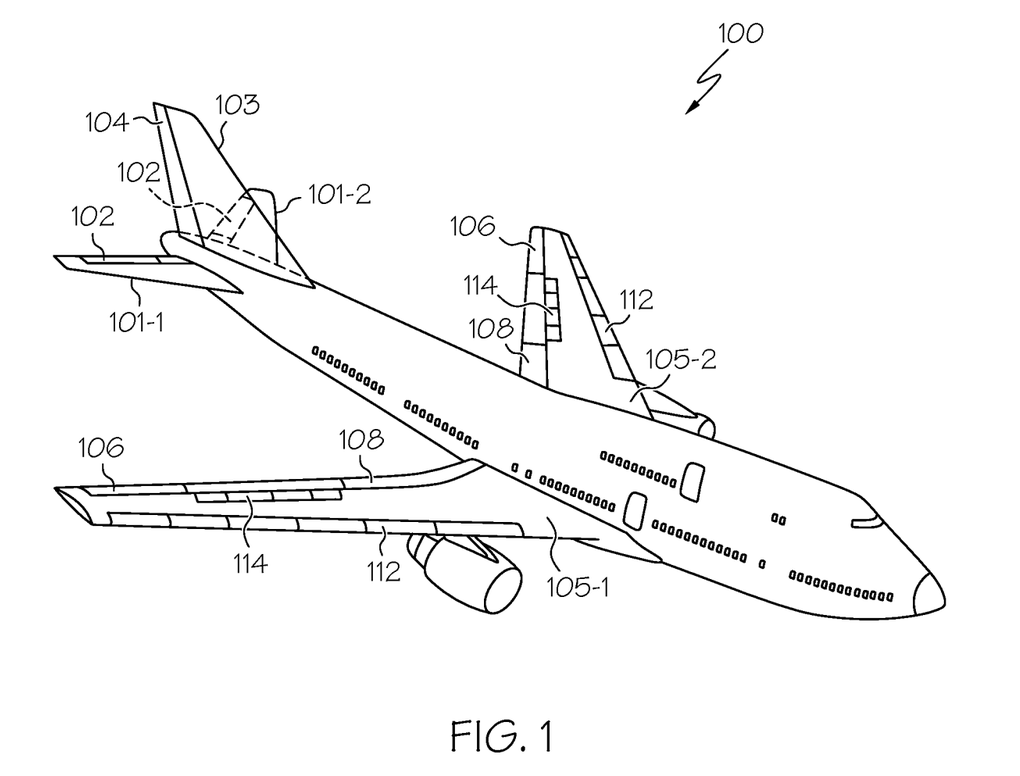
FIG. 1 is a perspective view of an exemplary aircraft depicting primary and secondary flight control surfaces.

Turning first to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100. It will additionally be appreciated that the aircraft 100 could include horizontal stabilizers (not shown).

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
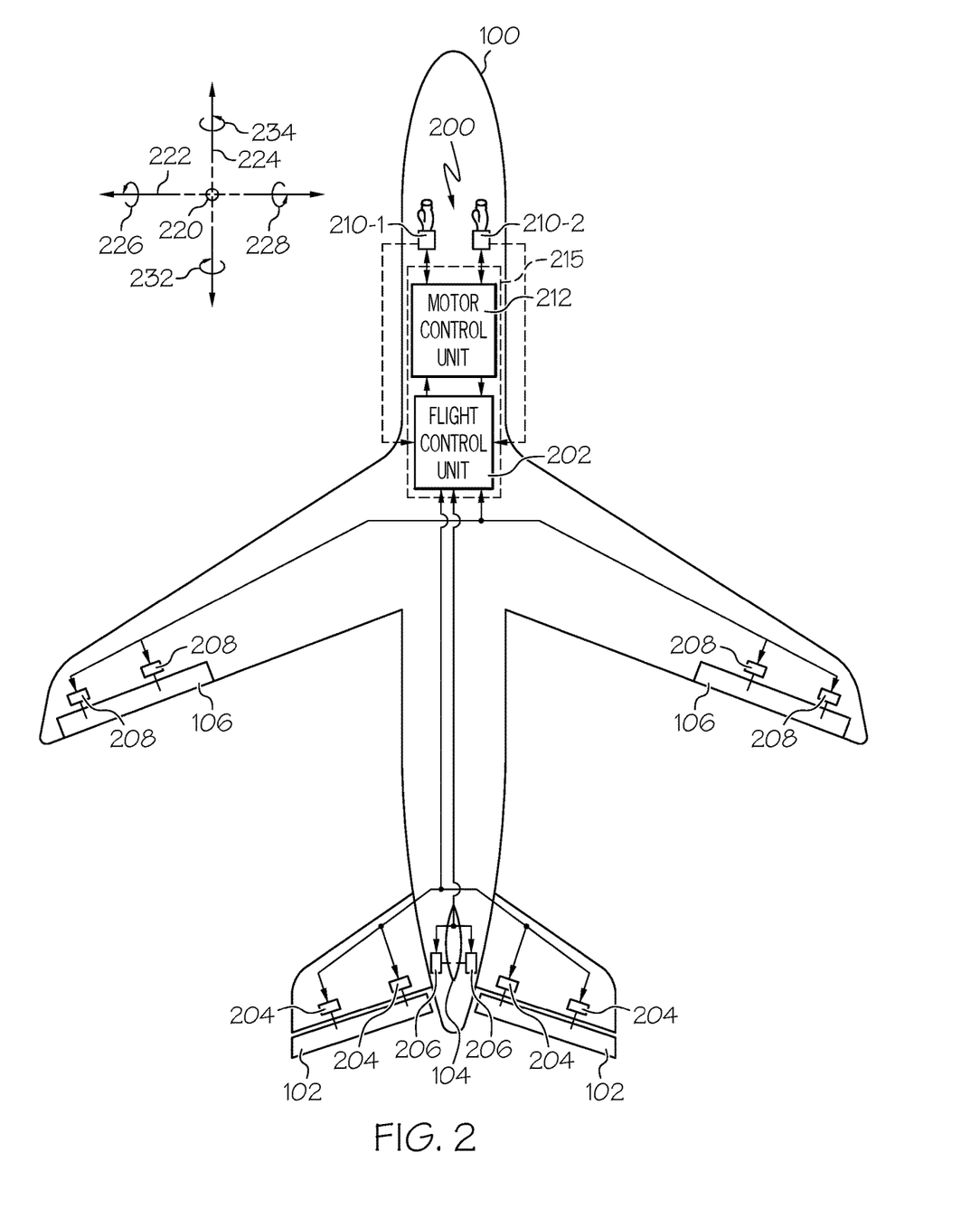
FIG. 2 is a schematic depicting portions of an exemplary flight control surface actuation system.

The flight control surfaces 102-114 are moved to commanded positions via a flight control surface actuation system 200, an exemplary embodiment of which is shown in FIG. 2. In the depicted embodiment, the flight control surface actuation system 200 includes one or more control units 202, a plurality of primary flight control surface actuators, which include elevator actuators 204, rudder actuators 206, and aileron actuators 208. It will be appreciated that the system 200 is preferably implemented with more than one control unit 202. However, for ease of description and illustration, only a single, multi-channel control unit 202 is depicted. It will additionally be appreciated that one or more functions of the control unit 202 could be implemented using a plurality of devices.

Before proceeding further, it is noted that the flight control surface actuation system 200 additionally includes a plurality of secondary control surface actuators, such as flap actuators, slat actuators, and spoiler actuators. However, the operation of the secondary flight control surfaces 108-114 and the associated actuators is not needed to fully describe and enable the present invention. Thus, for added clarity, ease of description, and ease of illustration, the secondary flight control surfaces and actuators are not depicted in FIG. 2, nor are these devices further described.

Returning now to the description, the flight control surface actuation system 200 may additionally be implemented using various numbers and types of primary flight control surface actuators 204-208. In addition, the number and type of primary flight control surface actuators 204-208 per primary flight control surface 102-106 may be varied. In the depicted embodiment, however, the system 200 is implemented such that two primary flight control surface actuators 204-208 are coupled to each primary flight control surface 102-106. Moreover, each of the primary flight control surface actuators 204-208 are preferably a linear-type actuator, such as, for example, a ballscrew actuator. It will be appreciated that this number and type of primary flight control surface actuators 204-208 are merely exemplary of a particular embodiment, and that other numbers and types of actuators 204-208 could also be used.

The primary flight control surface actuators 204-208 are each driven by one or more non-illustrated motors. Although the motors may be either electric, pneumatic, or hydraulic motors, in a particular preferred embodiment the motors are electric motors. The actuator motors are selectively energized and, upon being energized, rotate in one direction or another, to thereby supply a drive force to the associated primary flight control surface actuator 204-208. The primary flight control surface actuators 204-208 are each coupled to receive the drive force supplied from its associated actuator motor and, depending on the direction in which the actuator motors rotate, move between stowed and deployed positions, to thereby move the primary flight control surfaces 102-106. It will be appreciated that the actuator motors may be implemented as any one of numerous types of AC or DC motors, but in a preferred embodiment the actuator motors are preferably implemented as brushless DC motors.

With reference now to FIGS. 3-6, cross section views of a portion of one of the actuators 204-208 is depicted. In particular, an anti jam clutch 300, which axially disconnects portions of the actuator 204-208 from each other is depicted. To implement this functionality, the actuator 204-208, in addition to the anti jam clutch 300, includes an actuator housing 302 having an actuator housing outer section 302-1 and an actuator housing inner section 302-2. The actuator housing outer section 302-1 has an inner surface 301 and an outer surface 303, and the inner surface 301 defines an outer section cavity 305. The actuator housing inner section 302-2 is disposed at least partially within the outer section cavity 305, and also has an inner surface 307 and an outer surface 309. In the depicted embodiment, the actuator housing inner section 302-2 is the part of actuator housing 302 that is used to couple the actuator 204-208 to a movable component.

The actuator housing outer and inner sections 302-1, 302-2 both include a plurality of openings. That is, a plurality of first openings 312 is formed in the actuator housing outer section 302-1 and extend between the inner surface 301 and the outer surface 303 of the actuator housing outer section 302-1, and a plurality of second openings 314 is formed in the actuator housing inner section 302-2 and extend between the inner surface 305 and the outer surface 307 of the actuator housing inner section 302-2. The first and second openings 312, 314 are disposed such that each second opening 314 is aligned with a different one of the first openings 312.

The clutch 300 is mounted on the actuator housing outer section 302-1 and includes a clutch housing 316, a clutch motor 318, and a plurality of pins 322. The clutch housing 316 surrounds a portion of the actuator housing outer section 302-1 and is rotatable, relative to the actuator housing outer section 302-1, between an engaged position, which is the position depicted in FIGS. 3 and 4, and a disengaged position, which is the position depicted in FIGS. 5 and 6. As shown most clearly in FIGS. 4 and 6, the depicted clutch housing 316 includes an inner surface 402 that has a plurality of cam surfaces formed thereon. In the depicted embodiment, the cam surfaces include an inner cam track 404 and an outer cam track 406, which are spaced radially apart from each other.

Figure 4:
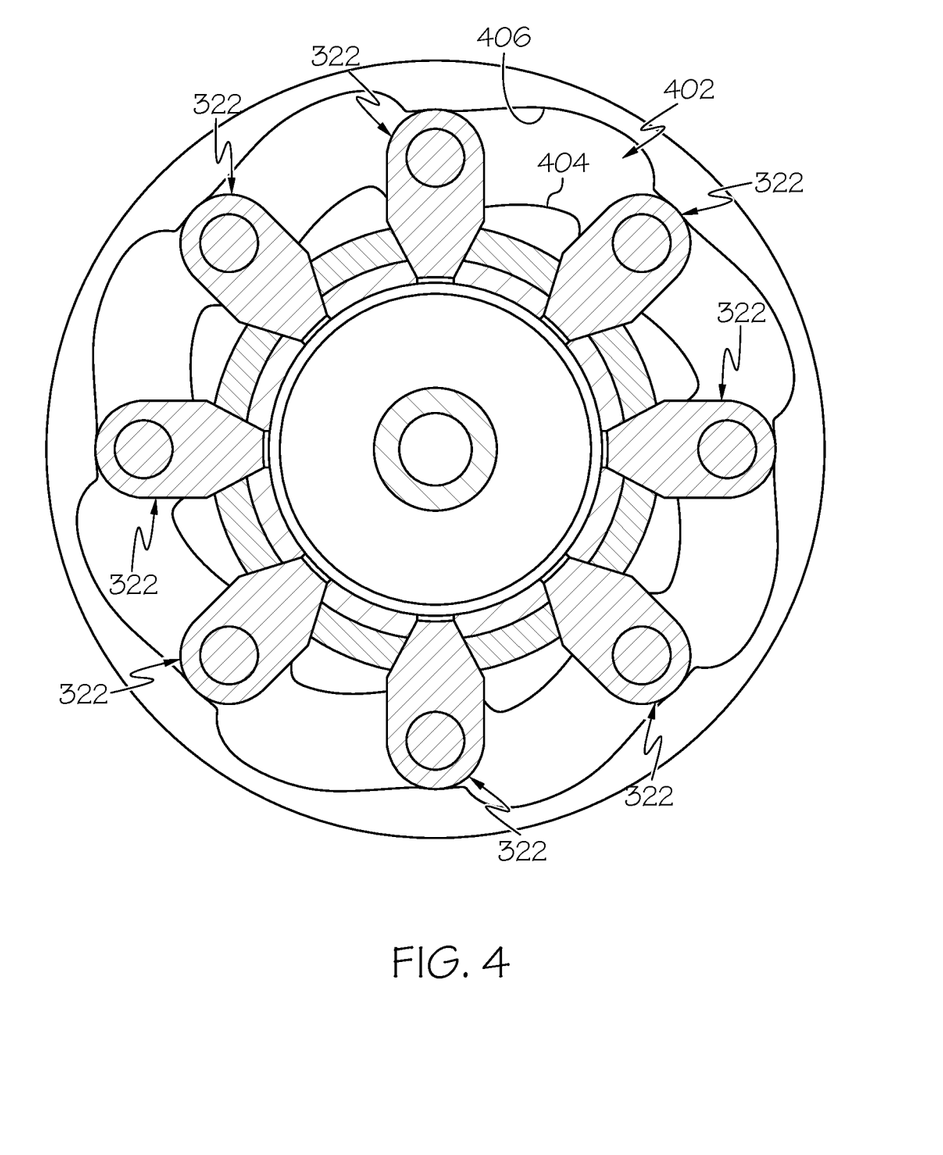
Figure 5:
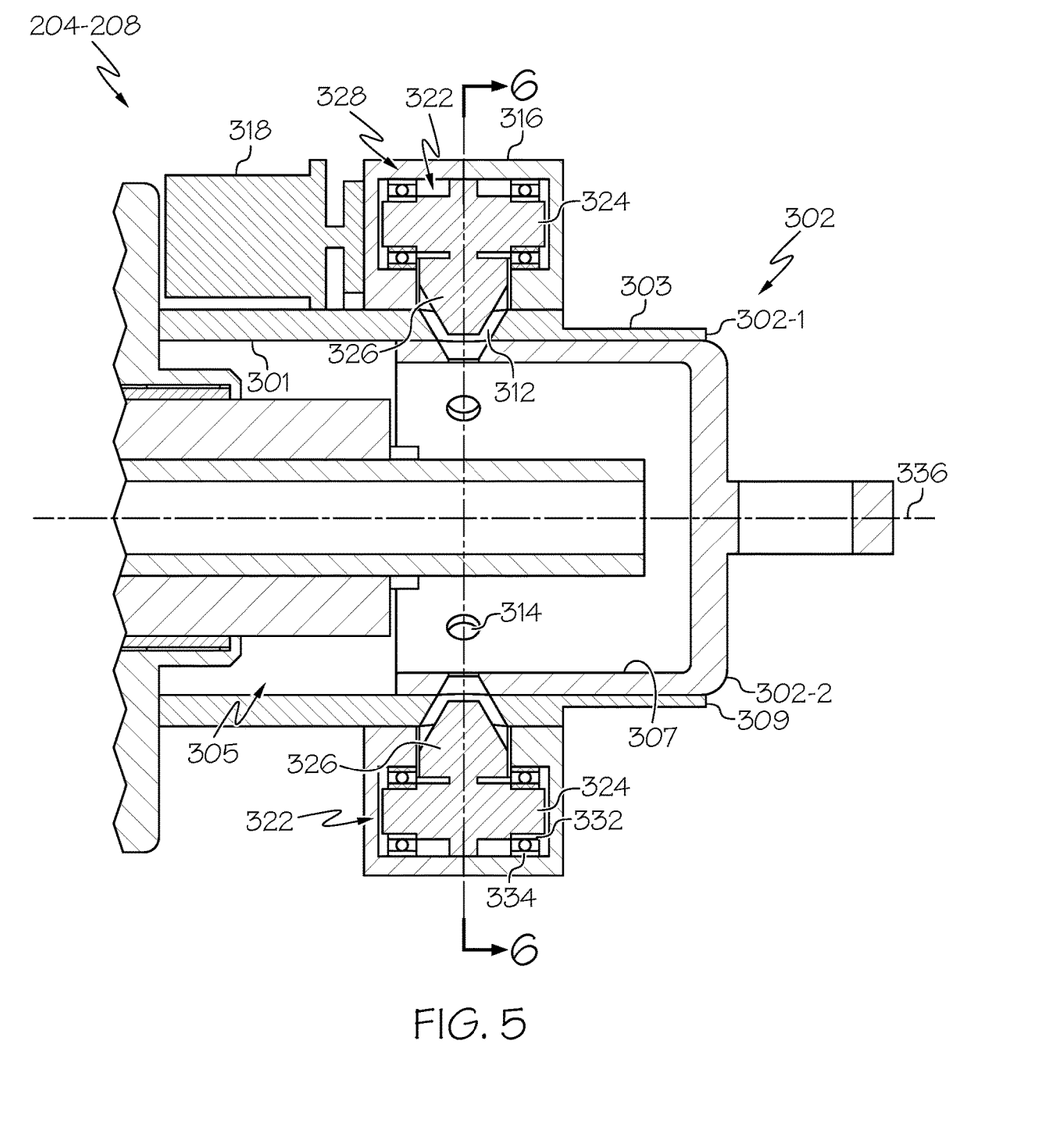
Figure 6:
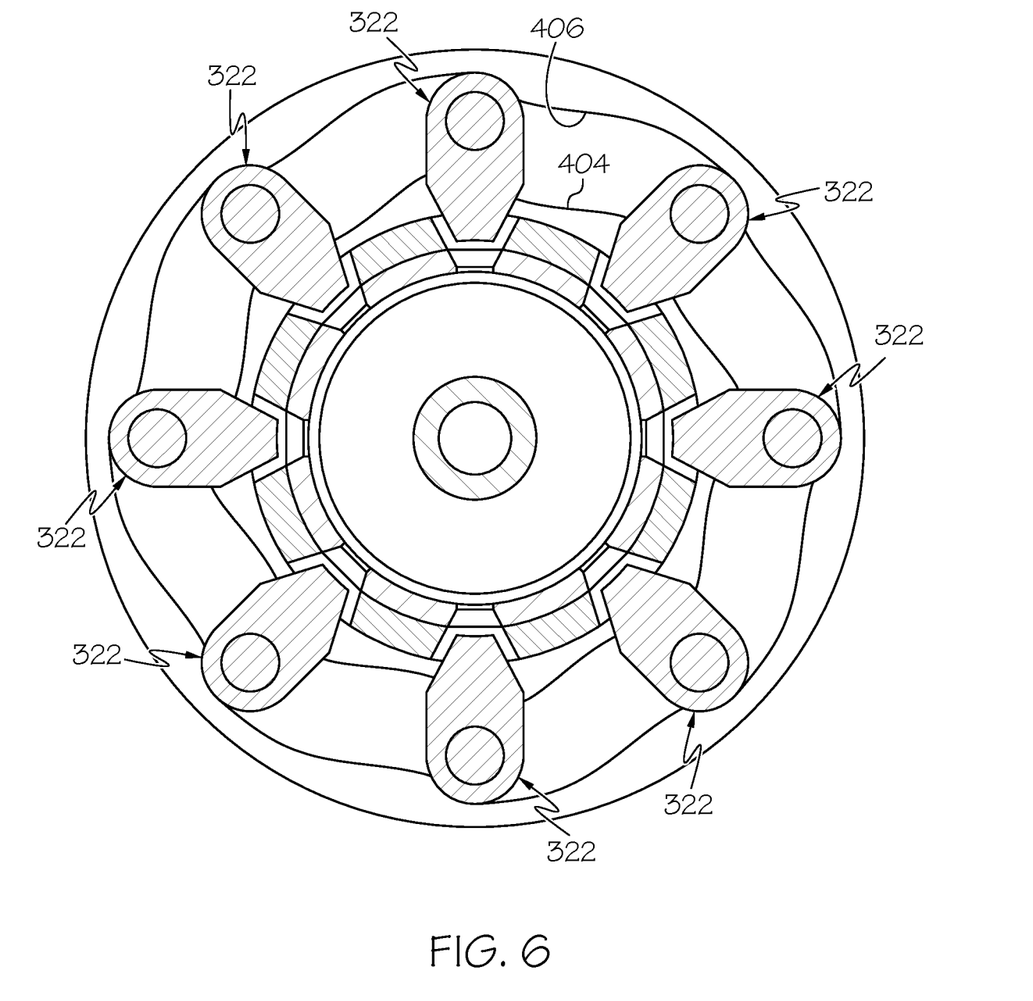

The clutch motor 318 is coupled to the clutch housing 316 and is configured, upon being energized, to rotate the clutch housing 316 between the engaged position (FIGS. 3 & 4) and the disengaged position (FIGS. 5 & 6). The clutch motor 318 may be controllably energized via the one or more control units 202 depicted in FIG. 2 and described above, or from a separate, non-illustrated control unit, that is dedicated to clutch motor operation.

The pins 322 are disposed within, and extend radially inwardly from, the clutch housing 316. Each pin extends at least partially into a different one of the first openings 312 and is movable between an extended position, which is the position depicted in FIGS. 3 and 4, and a retracted position, which is the position depicted in FIGS. 5 and 6. In the extended position, each pin 322 is disposed within a different one of the second openings 314, and in the retracted position, each pin 322 is not disposed within a different one of the second openings 314.

More specifically, when the clutch housing 316 is rotated into the engaged position, the pins 322 are moved to, and are retained in, the extended position, to thereby prevent relative movement between the actuator housing outer 302-1 and inner 302-2 sections. Conversely, when the clutch housing 316 is rotated into the disengaged position, the pins 322 are movable to the retracted position, to thereby allow relative movement between the actuator housing outer 302-1 and inner 302-2 sections.

Although the pins 322 may be variously configured an implemented, each pin 322 includes a shaft section 324 and a pin section 326. The shaft section 324 is rotationally mounted on a plurality of bearing assemblies 328, and the pin section 326 extends radially inwardly from the shaft section 324. As FIGS. 3-6 further depict, at least a portion of the pin section 326 is conically shaped.

The bearing assemblies 328 are disposed within the clutch housing 316 and each includes an inner race 332 and an outer race 334. The inner race 332 of each bearing assembly 328 is mounted on each of the pins 322, and more specifically one the shaft section 324 of each pin 322. The outer race 328 of each bearing assembly 324 engages the clutch housing 316.

Figure 3:
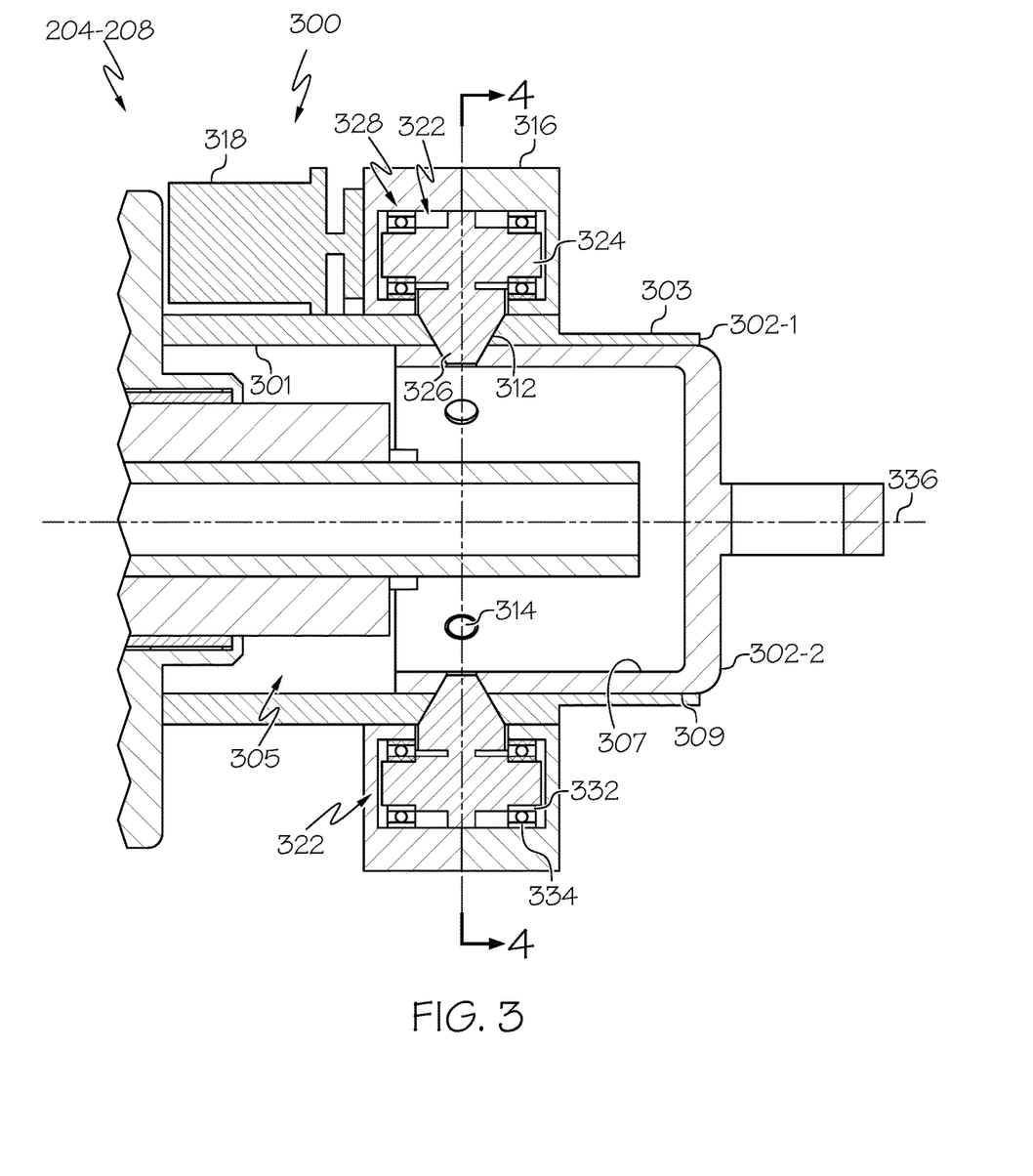
FIGS. 3-6 depict cross section views of a portion of one embodiment of the actuators.

As noted above, the clutch 300 is depicted in the engaged position in FIGS. 3 and 4. In this position, the clutch 300 connects the actuator housing outer 302-1 and an inner sections 302-2 via the plurality of pins 322. More specifically, each of the pins 322 extends, one each, through the first and second openings 312, 314. Thus, any axial force acting on the actuator housing outer section 302-1 is transferred through the pins 322 to the actuator housing inner section 302-2, and thus to a component to which the actuator 204-208 may be coupled.

As may be appreciated, the radial positions of each of the pins 322 is controlled by the inner and outer cam tracks 404, 406 that are formed on the inner surface 402 of the clutch housing 316. In the unlikely, yet postulated event of an actuator jam, the clutch motor 308 is energized to rotate. As shown in FIGS. 5 and 6, when the clutch motor 308 rotates, it causes the clutch housing 316 to rotate, relative to the actuator housing 302, a set angular distance about a rotational axis 336, and the cam tracks 404, 406 push the pins 322 from the second openings 314 in the actuator housing inner section 302-2.

The conical shape of the pin sections 324 allows the clutch 300 to be disconnected by any axial load condition. The axial force acting on the actuator 202-208, in combination with the cam tracks 404, 406, will push the pins 322 out of the openings second openings 314. The cam tracks 404, 406 also provide a means to lock the pins 322 in position. Because the pins 322 are mounted on bearing assemblies 328, the clutch 300 can be operated by a relatively small torque even when the actuator 204-208 is loaded with high axial force.

Figure 7:
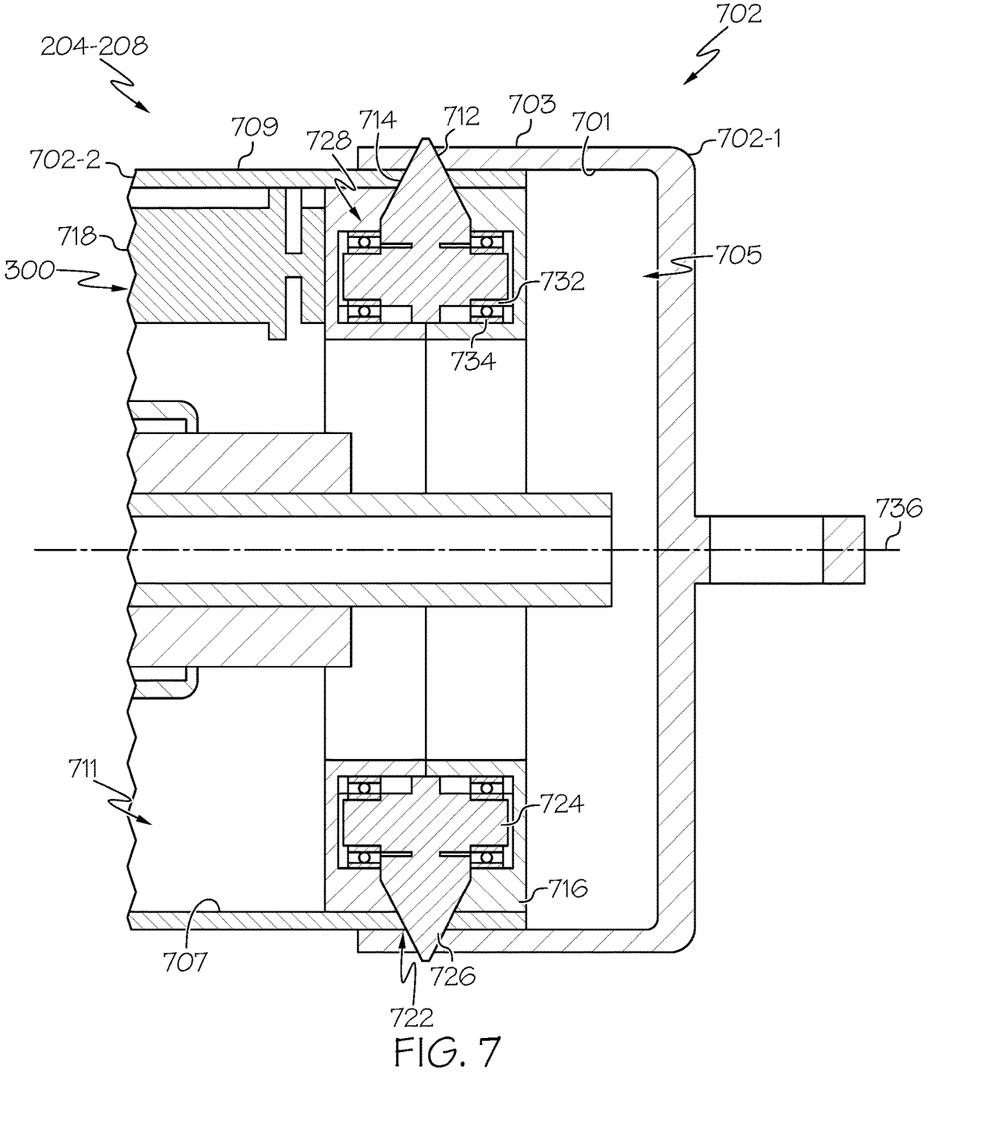
FIG. 7 depicts a cross section view of a portion of another embodiment of the actuators

In another embodiment, which is depicted in FIG. 7, the anti jam clutch 300 is disposed within one or more of the actuators 204-208. In this embodiment, the actuator 204-208 also includes an actuator housing 702 having an actuator housing outer section 702-1 and an actuator housing inner section 702-2. The actuator housing outer section 702-1 has an inner surface 701 and an outer surface 703, and the inner surface 701 defines an outer section cavity 705. The actuator housing inner section 702-2 is disposed at least partially within the outer section cavity 705, and also has an inner surface 707 and an outer surface 709, and the inner surface 707 defines an inner section cavity 711. In the depicted embodiment, the actuator housing outer section 702-1 is the part of actuator housing 702 that is used to couple the actuator 204-208 to a movable component.

The actuator housing outer and inner sections 702-1, 702-2 both include a plurality of openings. That is, a plurality of first openings 712 is formed in the actuator housing outer section 702-1 and extend between the inner surface 701 and the outer surface 703 of the actuator housing outer section 702-1, and a plurality of second openings 714 is formed in the actuator housing inner section 702-2 and extend between the inner surface 705 and the outer surface 707 of the actuator housing inner section 702-2. The first and second openings 712, 714 are disposed such that each second opening 714 is aligned with a different one of the first openings 712.

The clutch 300, in this embedment, is disposed within the inner section cavity 711 and includes a clutch housing 716, a clutch motor 718, and a plurality of pins 722. The clutch housing 716 is rotatable, relative to the actuator housing inner section 702-2, between an engaged position and a disengaged position. Similar to the previously described embodiment, the clutch housing 716 includes an inner surface that has a plurality of cam surfaces formed thereon, and the cam surfaces include an inner cam track 404 and an outer cam track 406, which are spaced radially apart from each other.

The clutch motor 718 is coupled to the clutch housing 716 and is configured, upon being energized, to rotate the clutch housing 716 between the engaged position (FIG. 7) and the disengaged position (not illustrated). The clutch motor 718 may be controllably energized via the one or more control units 202 depicted in FIG. 2 and described above, or from a separate, non-illustrated control unit, that is dedicated to clutch motor operation.

In the depicted embodiment, the pins 722 are disposed within, and extend radially outwardly from, the clutch housing 716. Each pin extends at least partially into a different one of the second openings 714 and is movable between an extended position, which is the position depicted in FIG. 7, and a non-illustrated retracted position. In the extended position, each pin 722 is disposed within a different one of the first openings 712, and in the retracted position, each pin 722 is not disposed within a different one of the second openings 712.

More specifically, when the clutch housing 716 is rotated into the engaged position, the pins 722 are moved to, and are retained in, the extended position, to thereby prevent relative movement between the actuator housing outer 702-1 and inner 702-2 sections. Conversely, when the clutch housing 716 is rotated into the disengaged position, the pins 722 are movable to the retracted position, to thereby allow relative movement between the actuator housing outer 702-1 and inner 702-2 sections.

Although the pins 722 may be variously configured an implemented, each pin 722 includes a shaft section 724 and a pin section 726. The shaft section 724 is rotationally mounted on a plurality of bearing assemblies 728, and the pin section 726 extends radially inwardly from the shaft section 724. As FIG. 7 further depicts, at least a portion of the pin section 726 is conically shaped.

The bearing assemblies 728 are disposed within the clutch housing 716 and each includes an inner race 732 and an outer race 734. The inner race 732 of each bearing assembly 728 is mounted on each of the pins 722, and more specifically one the shaft section 724 of each pin 722. The outer race 734 of each bearing assembly 724 engages the clutch housing 716.

As noted above, the clutch 300 is depicted in the engaged position in FIG. 7. In this position, the clutch 300 connects the actuator housing outer 702-1 and an inner sections 702-2 via the plurality of pins 722. More specifically, each of the pins 722 extends, one each, through the first and second openings 712, 714. Thus, any axial force acting on the actuator housing inner section 702-2 is transferred through the pins 722 to the actuator housing outer section 702-1, and thus to a component to which the actuator 204-208 may be coupled.

As may be appreciated, the radial positions of each of the pins 722 is controlled by the inner and outer cam tracks 404, 406 (see FIG. 4) that are formed on the inner surface 402 of the clutch housing 716. In the unlikely, yet postulated event of an actuator jam, the clutch motor 708 is energized to rotate. When the clutch motor 708 rotates, it causes the clutch housing 716 to rotate, relative to the actuator housing 702, a set angular distance about a rotational axis 736, and the cam tracks 404, 406 push the pins 722 from the first openings 712 in the actuator housing outer section 702-1.

The conical shape of the pin sections 724 allows the clutch 300 to be disconnected by any axial load condition. The axial force acting on the actuator 202-208, in combination with the cam tracks 404, 406, will push the pins 722 out of the first openings 712. The cam tracks 404, 406 also provide a means to lock the pins 722 in position. Because the pins 722 are mounted on bearing assemblies 728, the clutch 300 can be operated by a relatively small torque even when the actuator 204-208 is loaded with high axial force.

The actuator assembly described herein thus reduces the likelihood of component damage if it becomes inoperable by, for example, becoming jammed, without significantly increasing the cost and/or the weight of system components. The actuator assembly described herein also allows the controlled component, such as a flight control surface, to be actuated by adjacent actuator(s) in the unlikely event an actuator becomes jammed by disengaging the clutch on the jammed actuator, so that the jammed actuator does not further prevent the movement of controlled surface. The clutch allows the actuator to be mechanically disconnected from the controlled surface or supporting structure, even under high axial load with relatively low operating torque, to free the obstructed flight control surface.

In one embodiment, a fault tolerant actuator assembly includes an actuator housing outer section, an actuator housing inner section, a plurality of first openings, a plurality of second openings, and a clutch. The actuator housing outer section has an inner surface and an outer surface. The inner surface defines an outer section cavity. The actuator housing inner section is disposed at least partially within the outer section cavity, and has an inner surface and an outer surface. The first openings are formed in the actuator housing outer section and extend between the inner surface and the outer surface of the actuator housing outer section. The second openings are formed in the actuator housing inner section and extend between the inner surface and the outer surface of the actuator housing inner section, and each second opening is aligned with a different one of the first openings. The clutch is mounted on the actuator housing outer section and includes a clutch housing, a clutch motor, and a plurality of pins. The clutch housing surrounds a portion of the actuator housing outer section, and is rotatable, relative to the actuator housing outer section, between an engaged position and a disengaged position. The clutch motor is coupled to the clutch housing and is configured, upon being energized, to rotate the clutch housing between the engaged position and the disengaged position. The pins are disposed within, and extend radially inwardly from, the clutch housing. Each pin extends at least partially into a different one of the first openings and is movable between an extended position, in which each pin is disposed within a different one of the second openings, and a retracted position, in which each pin is not disposed within a different one of the second openings. When the clutch housing is rotated into the engaged position, the pins are moved to, and retained in, the extended position, to thereby prevent relative movement between the actuator housing outer and inner sections, and when the clutch housing is rotated into the disengaged position, the pins are movable to the retracted position, to thereby allow relative movement between the actuator housing outer and inner sections.

These aspects and other embodiments may include one or more of the following features. The clutch housing may include an inner surface having a plurality of cam surfaces formed thereon. The plurality of cam surfaces may include an inner cam track and an outer cam track, and the outer cam track may be spaced radially apart from the inner cam track. A plurality of bearing assemblies may be disposed within the clutch housing. Each bearing assembly may include an inner race and an outer race. The inner race of each bearing assembly may be mounted on each of the pins, and the outer race of each bearing assembly may engage the clutch housing. The pins may include a shaft section, on which each bearing assembly is mounted, and a pin section that extends radially inwardly from the shaft section. At least a portion of the pin section may be conically shaped. The actuator housing inner section may be configured to be coupled to a moveable component. The movable component may be an aircraft flight control surface.

In another embodiment, a clutch assembly that is adapted to be mounted on an actuator assembly having an outer section and an inner section that are moveable relative to each other includes a clutch housing, a clutch motor, and a plurality of pins. The clutch housing is configured to surround a portion of the actuator housing outer section, and is rotatable between an engaged position and a disengaged position. The clutch motor is coupled to the clutch housing and is configured, upon being energized, to rotate the clutch housing between the engaged position and the disengaged position. The pins are disposed within, and extend radially inwardly from, the clutch housing, and each pin is movable between an extended position and a retracted position. When the clutch housing is rotated into the engaged position, the pins are moved to, and retained in, the extended position, and when the clutch housing is rotated into the disengaged position, the pins are movable to the retracted position.

These aspects and other embodiments may include one or more of the following features. The clutch housing may include an inner surface having a plurality of cam surfaces formed thereon. The plurality of cam surfaces may include an inner cam track and an outer cam track, and the outer cam track may be spaced radially apart from the inner cam track. A plurality of bearing assemblies may be disposed within the clutch housing. Each bearing assembly may include an inner race and an outer race. The inner race of each bearing assembly may be mounted on each of the pins, and the outer race of each bearing assembly may engage the clutch housing. The pins may include a shaft section, on which each bearing assembly is mounted, and a pin section that extends radially inwardly from the shaft section. At least a portion of the pin section may be conically shaped.

In yet another embodiment, a fault tolerant actuator assembly includes an actuator housing outer section, an actuator housing inner section, a plurality of first openings, a plurality of second openings, and a clutch. The actuator housing outer section has an inner surface and an outer surface, and the inner surface of the actuator housing outer section defines an outer section cavity. The actuator housing inner section is disposed at least partially within the outer section cavity. The actuator housing inner section has an inner surface and an outer surface, and the inner surface of the actuator housing inner section defines an inner section cavity. The first openings are formed in the actuator housing outer section and extend between the inner surface and the outer surface of the actuator housing outer section. The second openings are formed in the actuator housing inner section and extend between the inner surface and the outer surface of the actuator housing inner section. Each second opening is aligned with a different one of the first openings. The clutch is disposed within the inner section cavity and includes a clutch housing, a clutch motor, and a plurality of pins. The clutch housing is rotatable, relative to the actuator housing inner section, between an engaged position and a disengaged position. The clutch motor is coupled to the clutch housing and is configured, upon being energized, to rotate the clutch housing between the engaged position and the disengaged position. The pins are disposed within, and extend radially outwardly from, the clutch housing. Each pin extends at least partially into a different one of the second openings and is movable between an extended position, in which each pin is disposed within a different one of the first openings, and a retracted position, in which each pin is not disposed within a different one of the first openings. When the clutch housing is rotated into the engaged position, the pins are moved to, and retained in, the extended position, to thereby prevent relative movement between the actuator housing outer and inner sections. When the clutch housing is rotated into the disengaged position, the pins are movable to the retracted position, to thereby allow relative movement between the actuator housing outer and inner sections.

These aspects and other embodiments may include one or more of the following features. The clutch housing may include an inner surface having a plurality of cam surfaces formed thereon. The plurality of cam surfaces may include an inner cam track and an outer cam track, and the outer cam track may be spaced radially apart from the inner cam track. A plurality of bearing assemblies may be disposed within the clutch housing. Each bearing assembly may include an inner race and an outer race. The inner race of each bearing assembly may be mounted on each of the pins, and the outer race of each bearing assembly may engage the clutch housing. The pins may include a shaft section, on which each bearing assembly is mounted, and a pin section that extends radially inwardly from the shaft section. At least a portion of the pin section may be conically shaped.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fault tolerant actuator assembly, comprising:
   an actuator housing outer section having an inner surface and an outer surface, the inner surface defining an outer section cavity;
   an actuator housing inner section disposed at least partially within the outer section cavity, the actuator housing inner section having an inner surface and an outer surface;
   a plurality of first openings formed in the actuator housing outer section and extending between the inner surface and the outer surface of the actuator housing outer section;
   a plurality of second openings formed in the actuator housing inner section and extending between the inner surface and the outer surface of the actuator housing inner section, each second opening aligned with a different one of the first openings; and
   a clutch mounted on the actuator housing outer section, the clutch comprising:
      a clutch housing surrounding a portion of the actuator housing outer section, the clutch housing rotatable, relative to the actuator housing outer section, between an engaged position and a disengaged position,
      a clutch motor coupled to the clutch housing and configured, upon being energized, to rotate the clutch housing between the engaged position and the disengaged position, and
      a plurality of pins disposed within, and extending radially inwardly from, the clutch housing, each pin extending at least partially into a different one of the first openings and movable between an extended position, in which each pin is disposed within a different one of the second openings, and a retracted position, in which each pin is not disposed within a different one of the second openings,
   wherein:
      when the clutch housing is rotated into the engaged position, the pins are moved to, and retained in, the extended position, to thereby prevent relative movement between the actuator housing outer and inner sections, and
      when the clutch housing is rotated into the disengaged position, the pins are movable to the retracted position, to thereby allow relative movement between the actuator housing outer and inner sections.

2. The actuator assembly of claim 1, wherein the clutch housing includes an inner surface having a plurality of cam surfaces formed thereon.

3. The actuator assembly of claim 2, wherein:
   the plurality of cam surfaces comprises an inner cam track and an outer cam track; and
   the outer cam track is spaced radially apart from the inner cam track.

4. The actuator assembly of claim 1, further comprising:
   a plurality of bearing assemblies disposed within the clutch housing, each bearing assembly including an inner race and an outer race, the inner race of each bearing assembly mounted on each of the pins, the outer race of each bearing assembly engaging the clutch housing.

5. The actuator assembly of claim 4, wherein each pin comprises:
   a shaft section, on which each bearing assembly is mounted; and
   a pin section extending radially inwardly from the shaft section.

6. The actuator assembly of claim 5, wherein at least a portion of the pin section is conically shaped.

7. The actuator assembly of claim 1, wherein the actuator housing inner section is configured to be coupled to a moveable component.

8. The actuator assembly of claim 7, wherein the movable component is an aircraft flight control surface.

9. A clutch assembly adapted to be mounted on an actuator assembly having an outer section and an inner section that are moveable relative to each other, the clutch comprising:
- a clutch housing configured to surround a portion of the actuator housing outer section, the clutch housing rotatable between an engaged position and a disengaged position;
- a clutch motor coupled to the clutch housing and configured, upon being energized, to rotate the clutch housing between the engaged position and the disengaged position, and
- a plurality of pins disposed within, and extending radially inwardly from, the clutch housing, each pin movable between an extended position and a retracted position, wherein:
  - when the clutch housing is rotated into the engaged position, the pins are moved to, and retained in, the extended position, and
  - when the clutch housing is rotated into the disengaged position, the pins are movable to the retracted position.

10. The clutch assembly of claim 9, wherein the clutch housing includes an inner surface having a plurality of cam surfaces formed thereon.

11. The actuator assembly of claim 10, wherein:
the plurality of cam surfaces comprises an inner cam track and an outer cam track; and
the outer cam track is spaced radially apart from the inner cam track.

12. The actuator assembly of claim 9, further comprising:
a plurality of bearing assemblies disposed within the clutch housing, each bearing assembly including an inner race and an outer race, the inner race of each bearing mounted on each of the pins, the outer race of each bearing assembly engaging the clutch housing.

13. The actuator assembly of claim 12, wherein each pin comprises:
- a shaft section, on which each bearing assembly is mounted; and
- a pin section extending radially inwardly from the shaft section.

14. The actuator assembly of claim 13, wherein at least a portion of the pin section is conically shaped.

15. A fault tolerant actuator assembly, comprising:
- an actuator housing outer section having an inner surface and an outer surface, the inner surface of the actuator housing outer section defining an outer section cavity;
- an actuator housing inner section disposed at least partially within the outer section cavity, the actuator housing inner section having an inner surface and an outer surface, the inner surface of the actuator housing inner section defining an inner section cavity;
- a plurality of first openings formed in the actuator housing outer section and extending between the inner surface and the outer surface of the actuator housing outer section;
- a plurality of second openings formed in the actuator housing inner section and extending between the inner surface and the outer surface of the actuator housing inner section, each second opening aligned with a different one of the first openings; and
- a clutch disposed within the inner section cavity, the clutch comprising:
  - a clutch housing rotatable, relative to the actuator housing inner section, between an engaged position and a disengaged position,
  - a clutch motor coupled to the clutch housing and configured, upon being energized, to rotate the clutch housing between the engaged position and the disengaged position, and
  - a plurality of pins disposed within, and extending radially outwardly from, the clutch housing, each pin extending at least partially into a different one of the second openings and movable between an extended position, in which each pin is disposed within a different one of the first openings, and a retracted position, in which each pin is not disposed within a different one of the first openings,
  wherein:
    when the clutch housing is rotated into the engaged position, the pins are moved to, and retained in, the extended position, to thereby prevent relative movement between the actuator housing outer and inner sections, and
    when the clutch housing is rotated into the disengaged position, the pins are movable to the retracted position, to thereby allow relative movement between the actuator housing outer and inner sections.

16. The actuator assembly of claim 15, wherein the clutch housing includes an inner surface having a plurality of cam surfaces formed thereon.

17. The actuator assembly of claim 16, wherein:
the plurality of cam surfaces comprises an inner cam track and an outer cam track; and
the outer cam track is spaced radially apart from the inner cam track.

18. The actuator assembly of claim 15, further comprising:
a plurality of bearing assemblies disposed within the clutch housing, each bearing assembly including an inner race and an outer race, the inner race of each bearing assembly mounted on each of the pins, the outer race of each bearing assembly engaging the clutch housing.

19. The actuator assembly of claim 18, wherein each pin comprises:
- a shaft section, on which each bearing assembly is mounted; and
- a pin section extending radially inwardly from the shaft section.

20. The actuator assembly of claim 19, wherein at least a portion of the pin section is conically shaped.

* * * * *